United States Patent [19]

Idogaki et al.

[11] Patent Number: 4,922,753
[45] Date of Patent: May 8, 1990

[54] ACCELERATION SENSOR

[75] Inventors: Takaharu Idogaki, Okazaki; Ikuo Hayashi, Nukata; Toshihisa Ishihara, Nishio; Tatsuo Sugitani, Mishima; Hideo Inoue, Ashigarakami, all of Japan

[73] Assignee: Nippon Soken, Inc., Nishio, & Toyota Jidosha Kabushiki Kaisha, Toyota, Japan

[21] Appl. No.: 199,747

[22] Filed: May 27, 1988

[30] Foreign Application Priority Data

May 30, 1987 [JP] Japan ............... 62-133398
Feb. 13, 1988 [JP] Japan ................ 63-30068

[51] Int. Cl.⁵ .................................... G01P 15/08
[52] U.S. Cl. ........................... 73/516 R; 73/517 R
[58] Field of Search ......... 73/516 R, 516 LM, 517 R, 73/DIG. 3; 310/90.5

[56] References Cited

U.S. PATENT DOCUMENTS 4,043,204  8/1977  Hunter et al. ............... 73/516 R
4,047,439  9/1977  Russell et al. ............... 73/516 R
4,498,341  2/1985  Breitbach et al. ............ 73/517 R
4,706,498  11/1987 Nemnich et al. ............. 73/516 R

FOREIGN PATENT DOCUMENTS 60-133370  7/1985  Japan .
60-203861  10/1985 Japan .
60-233564  11/1985 Japan .

OTHER PUBLICATIONS

R. E. Rosenweig, "The Fascinating Magnetic Fluids", *New Scientist*, 20, Jan. 1966, pp. 146–148.

Primary Examiner—Hezron E. Williams
Assistant Examiner—Robert P. Bell
Attorney, Agent, or Firm—Cushman, Darby & Cushman

[57] ABSTRACT

An acceleration sensor including a magnetic fluid, a permanent magnet emplaced movably in the magnetic fluid, a nonmagnetic case, in which case the magnetic fluid and the permanent magnet are sealed and from which case air is substantially excluded, the shape of internal receptacle of the case dominating the shape of the magnetic fluid, whereby the path of the magnetic flux generated by the permanent magnet is restricted and the permanent magnet in the magnetic fluid is given an automatic positioning function, a unit for detecting the position of the permanent magnet, and a processing circuit for processing signals from the detection unit.

23 Claims, 10 Drawing Sheets

Fig. 18(a)    Fig. 18(b)
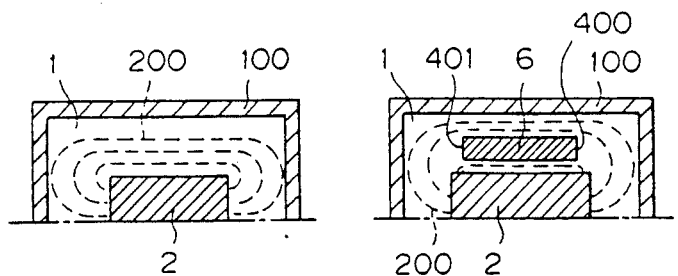
Fig. 19
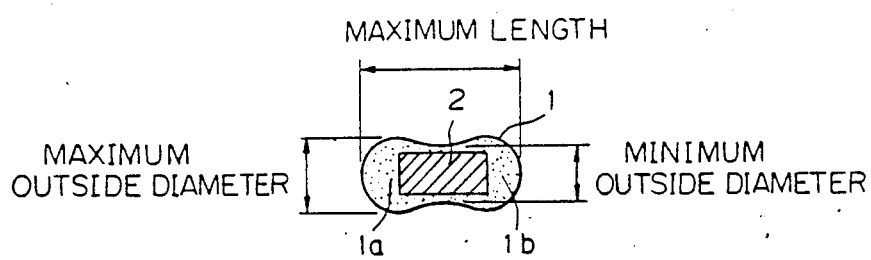
Fig. 20    Fig. 21    Fig. 22
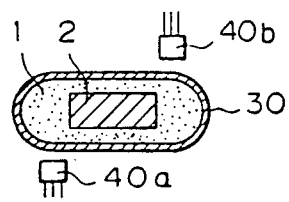 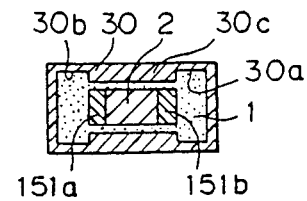 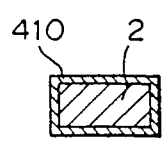

ACCELERATION SENSOR

BACKGROUND OF THE INVENTION

1. Field of the Invention

The present invention relates to an acceleration sensor for determining vehicular acceleration, the sensor being used in electronically controlled braking systems of automobiles and other vehicles, for example.

2. Description of the Related Art

A conventional acceleration sensor includes a magnetic fluid sealed in a case and movable in the acceleration direction, a fixed permanent magnet magnetizing the magnetic fluid, and a coil for detecting deformation of the magnetic fluid. The displacement of the magnetic fluid determines the magnitude of electromotive force generated at the coil, which constitutes a differential transformer, and the magnitude of the electromotive force determines the displacement of the magnetic fluid and detects the acceleration. See, for example, Japanese Unexamined Patent Publication (Kokai) No. 60-133370.

In the above acceleration sensor of the prior art, however, the magnetic fluid vibrates in the air or other medium and thus air bubbles and liquid bubbles or the like are easily formed. Further, a complicated construction is required to facilitate the deformation of the magnetic fluid, and since the sensor operates on the principle of detecting changes in the shape of the magnetic fluid, a problem arises in that the sensor is very susceptible to the effects of changes in viscosity and an expansion of volume due to temperature changes.

SUMMARY OF THE INVENTION

The present invention resolves the above-mentioned problems and detects acceleration with a simple construction and high sensitivity.

The present invention provides an acceleration sensor including a magnetic fluid, a permanent magnet movably placed in the magnetic fluid, a nonmagnetic case in which the magnetic fluid and the permanent magnet are sealed and air is not substantially included. The shape of the internal receptacle of the case dominates the shape of the magnetic fluid, and thus the path of the magnetic flux generated by the permanent magnet is restricted and the permanent magnet in the magnetic fluid is given an automatic positioning function. Also provided are a means for detecting the position of the permanent magnet, and a circuit for processing signals from the detection means.

With the above construction, when acceleration is not applied, the permanent magnet placed in the magnetic fluid is forced magnetically to a stable position (i.e., central position of the magnetic fluid) where the distribution of the magnetic fluxes generated by the magnet perse has reached an equilibrium. But when acceleration is applied, due to inertia, the permanent magnet is forced in a reverse direction relative to the acceleration direction, and simultaneously, the permanent magnet is forced magnetically toward the stable position. Therefore, the permanent magnet stabilizes at the position where the above two forces are balanced. The magnitude of the acceleration is measured by detecting the position of the permanent magnet.

BRIEF DESCRIPTION OF THE DRAWINGS

FIGS. 18(a) and (b) are views for explaining the state of magnetic flux generated from the permanent magnet placed in the magnetic fluid;

FIG. 19 is a view for explaining the state wherein the magnetic fluid is naturally attracted around the permanent magnet;

FIG. 20 is a view showing a modification in the use of magnetic resistance elements as the permanent magnet-position detection means;

FIG. 21 is a view showing another modification of the case portion in which the permanent magnet and magnetic fluid are sealed;

FIG. 22 is a view showing an example of the permanent magnet provided with a nonmagnetic cover;

DESCRIPTION OF THE PREFERRED EMBODIMENTS

Figure 1:
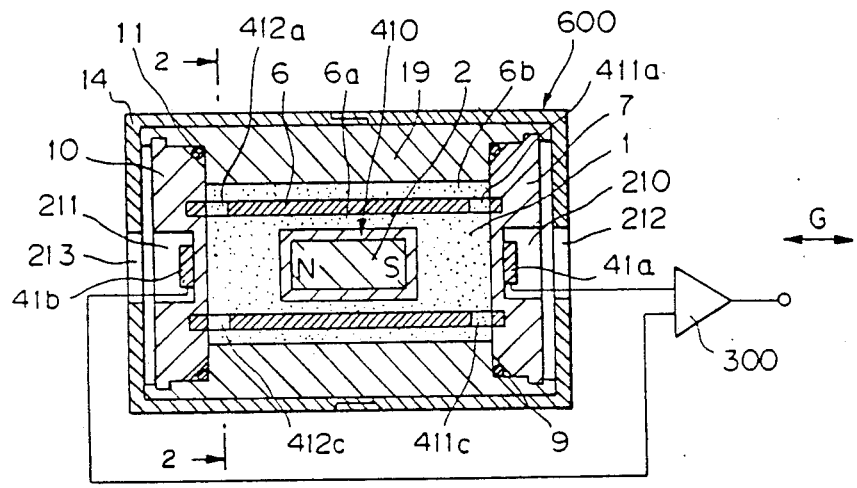
FIG. 1 is a longitudinal sectional view of an acceleration sensor according to a first embodiment of the present invention.
Figure 2:
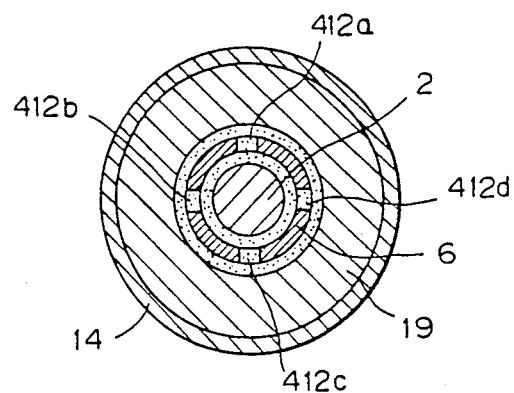
FIG. 2 is a lateral sectional view taken along the line B—B of FIG. 1.
Figure 3:
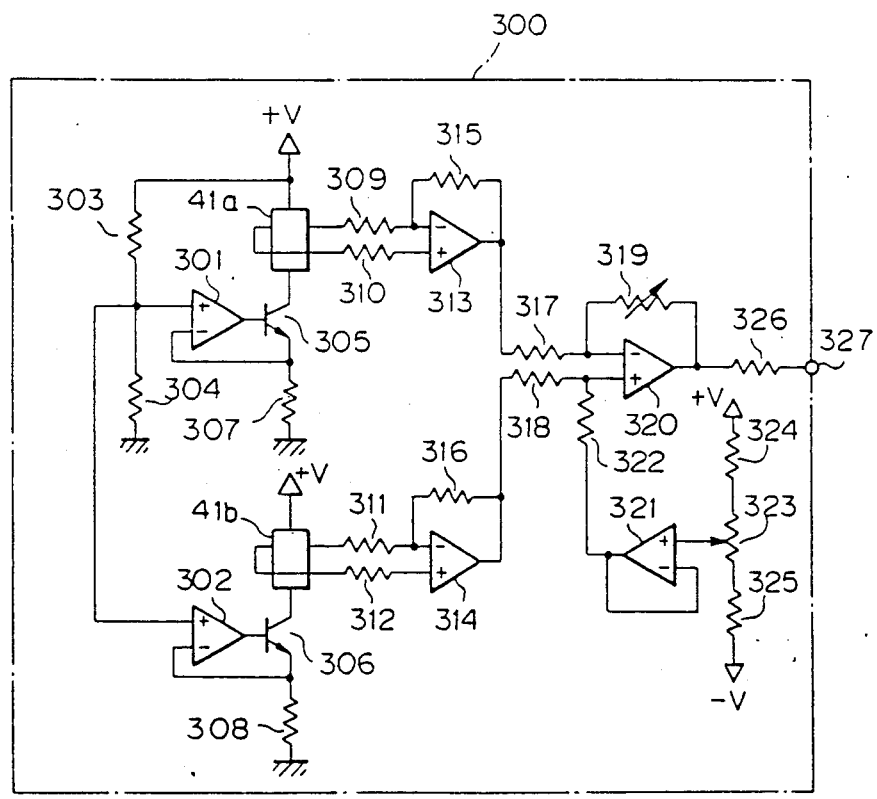
FIG. 3 is a circuit diagram showing a specific example of a processing circuit for processing signals from the permanent magnet-position detection means.

FIG. 1 is a longitudinal sectional view of a main structural portion 600 of an acceleration sensor according to a first embodiment of the present invention. Reference numeral 1 denotes a magnetic fluid and 2 is a cylindrical permanent magnet covered by an aluminum cover 410 and floating stably in the magnetic fluid 1. Reference numeral 19 denotes a cylindrical holder case made of aluminum and 6 is a cylindrical return force adjustment holder placed concentrically around the external circumferential surface of the permanent magnet 2 with a slight clearance therebetween and affixed to the holder case 19. Reference numeral 7 is a front plate made of aluminum and affixed to the holder case 19, and reference numeral 9 is an O-ring for sealing. Reference numeral 10 is an aluminum end plate affixed to the holder case 19 in the same way as the front plate 7, and reference numeral 11 is an O-ring. The magnet 2 floats at the center of the cylindrical space of the holder 6, separated by a gap 6a from the internal circumferential surface of the holder 6. The rest of the space in the case 19 is filled with the magnetic fluid 1. Reference numeral 14 denotes an iron case covering the entire assembly. The distance between the surface of the front plate 7 in contact with the magnetic fluid and the surface of the case 14 parallel to the surface of the plate 7 is made the same as the distance between the surface of the end plate 10 in contact with the magnetic fluid and the surface of the case 14 parallel to the surface of the plate 10. Holes 411a to d and 412a to d are provided at the two ends of the holder 6 and communicate a cylindrical portion 6b formed by the holder case 19 and holder 6 with the internal cylindrical space of the holder 6. Reference numerals 41a and 41b denote Hall elements adhered to the holes 210 and 211 provided in the front plate 7 and the end plate 10; these Hall elements 41a and 41b being oriented in the same direction. Therefore, when the S pole of the magnet 2 approaches the Hall element 41a, the output of the Hall element 41a becomes larger in the positive direction, and simultaneously, the Hall element 41b becomes more distant from the N pole of the magnet, so the output of the Hall element 41b is reduced but is also positive. The lead lines from the input/output terminals of the Hall elements 41a and 41b are drawn out to the outside from the hole portions 212 and 213 provided at the shield case 14 and are connected to a circuit portion 300. FIG. 2 is a lateral sectional view taken along the line B—B of FIG. 1. In FIG. 1, this state is shown schematically. FIG. 3 shows the circuit portion 300. One ends of resistors 303 and 304 are connected to positive input terminals of current feedback operational amplifiers 301 and 302, and the other end of the resistor 303 is connected to the positive reference power source and the other end of the resistor 304 is grounded. The negative input terminals of the operational amplifiers 301 and 302 are respectively connected to resistors 307 and 308 the other ends of which are grounded, and simultaneously, are connected to the emitters of transistors 305 and 306. The base of the transistor 305 is connected to the output terminal of the operational amplifier 301 and the collector is connected to the negative terminal of the Hall element 41a. The base of the transistor 306 is connected to the output terminal of the operational amplifier 302 and the collector is connected to the negative terminal of the Hall element 41b. Further, the positive terminals of the Hall elements 41a and 41b are connected to the positive reference power sources. Reference numerals 313 and 314 denote operational amplifiers for performing differential amplification and are connected to output terminal pairs of the Hall elements 41a and 41b through resistors 309 and 310 or resistors 311 and 312 at the positive and negative input terminals thereof. Further, the negative input terminal of the operational amplifier 313 is connected to the output terminal of the operational amplifier 313 through a resistor 315 and the negative input terminal of the operational amplifier 314 is connected to the output terminal of the operational amplifier 314 through a resistor 316. The output terminals of the operational amplifiers 313 and 314 are connected to the input terminals of the operational amplifier 320 through resistors 317 and 318, respectively. Reference numeral 319 denotes a variable resistor for gain adjustment and is connected at one end to the negative input terminal of the operational amplifier 320 and at the other end to the output terminal of the operational amplifier 320. The positive input terminal of the operational amplifier 320 is connected through a resistor 322 to the output terminal and negative input terminal of the operational amplifier 321, and the positive input terminal of the operational amplifier 321 is connected to the variable terminal of a variable resistor 323. One fixed terminal of the resistor 323 is connected through a resistor 324 to the positive reference power source and the other fixed terminal is connected through a resistor 325 to the negative reference power source. The output terminal of the operational amplifier 320 is connected through a resistor 326 to an output terminal 327.

Figure 23:
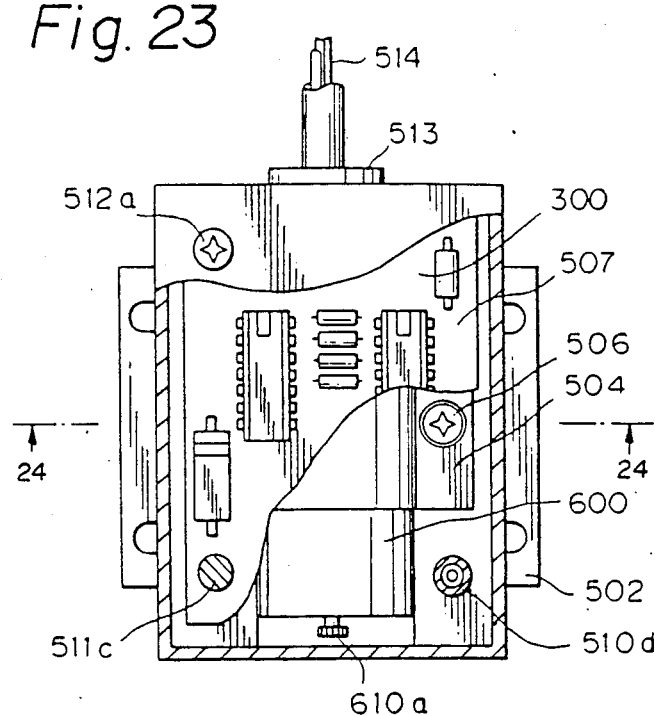
FIG. 23 is a partially cutaway plan view showing the overall construction of an acceleration sensor according to the present invention.
Figure 24:
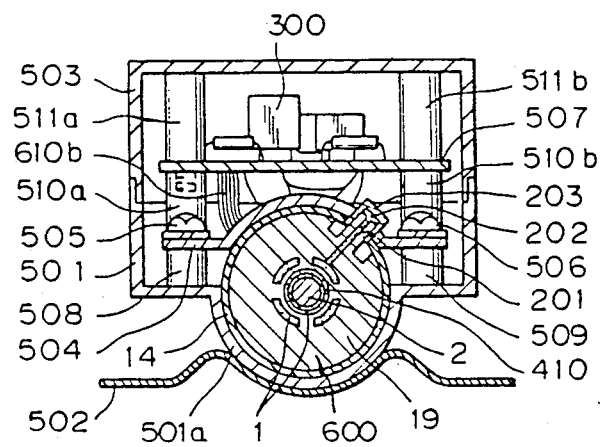
FIG. 24 is a lateral sectional view taken along the line C—C of FIG. 23.

An embodiment of the present invention shown in FIG. 1 including the circuit portion 300 is shown in FIG. 23. FIG. 24 is a sectional view taken along the line C—C of FIG. 23. A box shaped iron housing 501 has a semicylindrical protrusion 501a and a stay 502 welded to the bottom thereof. Reference numeral 503 denotes a housing cover forming a box together with the housing 501 and accommodating the main structural portion 600 of the acceleration sensor and the circuit portion 300. Reference numeral 504 denotes an aluminum sensor clamp fixed to the studs 508 and 509 welded to the housing 501 by screws 505 and 506, to fix the main structural portion 600 to the housing 501. Reference numeral 507 denotes a printed circuit board carrying the circuit portion 300 and is cofastened by screws and spacers 511a to d and the second studs 510a to d welded to the housing 501. The spacers 511a to d are cofastened with the housing cover 503 by screws 512a to d, and thus the housing 501 and the housing cover 503 are fixed. Reference numerals 610a and b denote lead line bundles from the Hall elements 41a and 41b and connected to the printed circuit board 507. Reference numeral 513 denotes a rubber bushing sandwiched between the housing 501 and the housing cover 503. The lead line bundle 514 is taken outside the printed circuit board 507 through a hole in the central portion of the rubber bushing 513.

Figure 14:
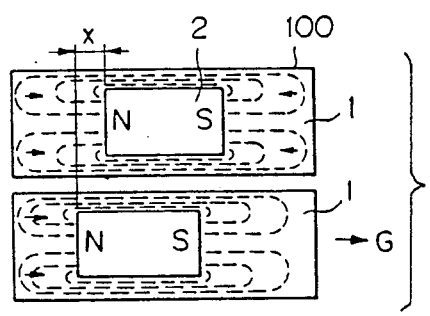
FIG. 14 is a view for explaining the principle of operation of the acceleration sensor of the present invention.

This device includes a permanent magnet placed in magnetic fluid and utilizes the position adjusting phenomenon of the permanent magnet in the magnetic fluid in a limited space based on magnetic viscoelasticity arising due to the proportionality of the magnetic fluid apparent density to magnetic field gradient, to realize a one-dimensional displacement of the permanent magnet depending on the magnitude of acceleration. By detecting this displacement, a stable monoaxial accelration detection can be performed. FIG. 14 is a schematic view of magnetic flux when the magnetic fluid 1 and permanent magnet 2 are sealed in a case 100. The magnetic fluxes of the permanent magnet 2 draw 100 ps concentrated to some extent at the magnetic fluid 1 with a permeability of 3 to 5, compared to the case (non-magnetic body) 100 and the air outside (specific permeability of about 1). The magnetic fluxes receive Maxwell stress and tend to be formed at equal spaces and to pass along the shortest distance. The magnetic fluid 1 is both a magnetic substance and a fluid and, therefore, takes any shape. Accordingly, the Maxwell stress acts directly on the permanent magnet, and when acceleration is not applied, as shown in FIG. 14(a), the permanent magnet is stabilized at the position where the magnetic fluxes generated by the permanent magnet 2 reach an equilibrium. In this state, when an acceleration G is applied as in FIG. 14(b), due to the total specific gravity 1.3 of the magnetic fluid, for example, and when a rare earth magnet is used, the specific gravity of the magnet of 8.3, for example, inertia causes the magnet 2 to be forced in the direction opposite to the acceleration G in the case 100. The magnet 2 receives a magnetic return force, so stabilizes at a position (x) where the above two forces balance. The distance x of the magnet corresponds to the acceleration G, and when x is determined, the acceleration G is measured. Specifically, the apparent density Sd of the magnetic fluid has the following relationship with the true density Se of the magnetic fluid, the magnetization M of the magnetic fluid, the magnetic field gradient GradH, and the acceleration of gravity g: $Sd = Se + (M/4\pi g)$ GradH. Further, the permanent magnet generates a magnetic field in the surrounding space which is roughly inverse in proportion to the square of the distance. Therefore, the closer it approaches to the permanent magnet, the larger the apparent density of the magnetic fluid and the greater the elasticity effect due to the repulsion force of the surface active agent in the magnetic fluid, and thus a repulsion force is considered to be generated between the permanent magnet and the case wall. Therefore, the inertia mass with respect to the acceleration is not only that of the permanent magnet but should include the distribution mass of the magnetic fluid which is under a high density around the permanent magnet.

Figure 4:
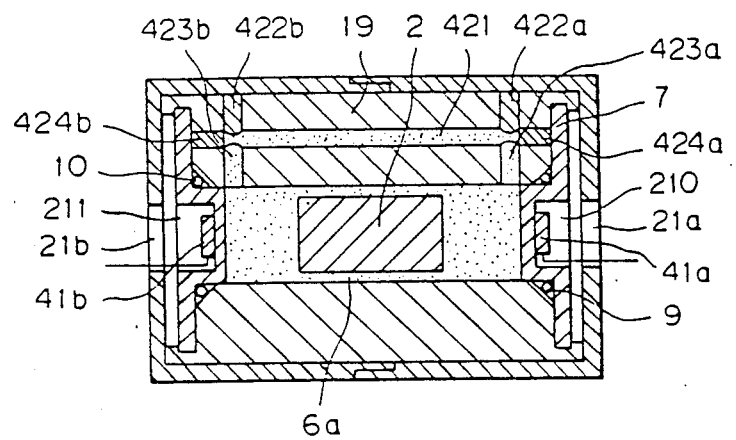
FIG. 4 is a longitudinal sectional view of an acceleration sensor according to a second embodiment of the present invention.

FIG. 4 is a longitudinal sectional view of an acceleration sensor according to the second embodiment of the present invention. In this embodiment, the holder 6 in FIG. 1 is eliminated. The inner circumference of the holder case 19 is cylindrical with an inside diameter larger than the outside diameter of the permanent magnet 2 and smaller than the maximum outside diameter of the magnetic fluid, which is attracted to the permanent magnet 2 in the natural state. Further, the holder case 19 is provided with holes 423a and 423b which perpendicularly intersect the cylindrical hole in the holder case 19 and communicate with the hole 421 provided in parallel to the hole of the holder case 19. Reference numerals 422a, 422b, 424a, and 424b are all blind plugs. The spaces in the case 19 including the holes 423a, 423b and 421 are filled with the magnetic fluid 1. In this way, although omitting the holder 6 in FIG. 1, the bypass hole 421 enables smooth movement of the magnetic fluid along with the displacement of the magnet.

Figure 5:
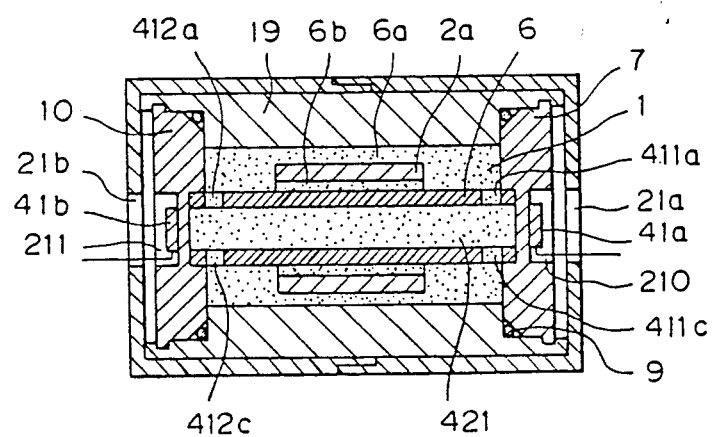
FIG. 5 is a longitudinal sectional view of an acceleration sensor according to a third embodiment of the present invention.

FIG. 5 is a longitudinal sectional view of the third embodiment. Reference numeral 2a is a cylindrical magnet. Reference numeral 6 is a cylindrical holder with an outside diameter smaller than the inside diameter of the cylindrical magnet 2a. That is, compared with the embodiment of FIG. 1, the permanent magnet is not solid, but hollow, and the cylindrical holder 6 is located inside the cylindrical magnet. Therefore, the bypass passage of the magnetic fluid with respect to the displacement of the permanent magnet 2a represents the inside 421 of the cylindrical holder 6.

Various methods of sensing the displacement of the magnet in the magnetic fluid are considered. For example, when the permeability of the magnetic fluid is 3 to 5 and the permeability of the magnet is about 1, the position of the magnet in the magnetic fluid is detected in a manner exactly reverse to a differential transformer.

Figure 6:
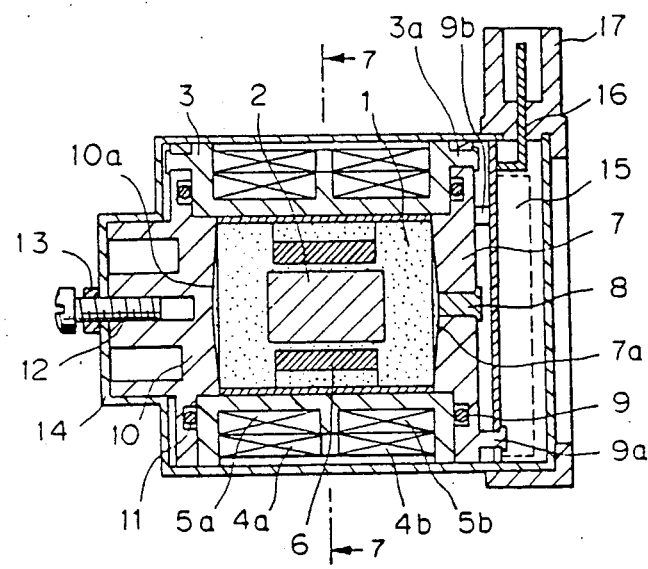
FIG. 6 is a longitudinal sectional view of an acceleration sensor according to a fourth embodiment of the present invention.
Figure 7:
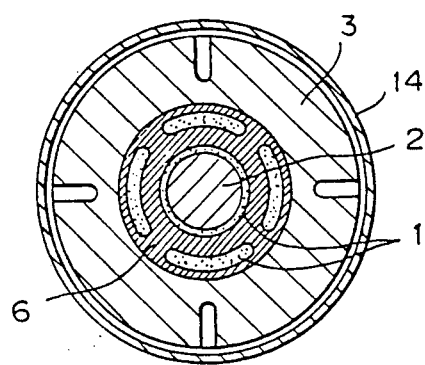
FIG. 7 is a lateral sectional view taken along the line A—A of FIG. 6.
Figure 16:
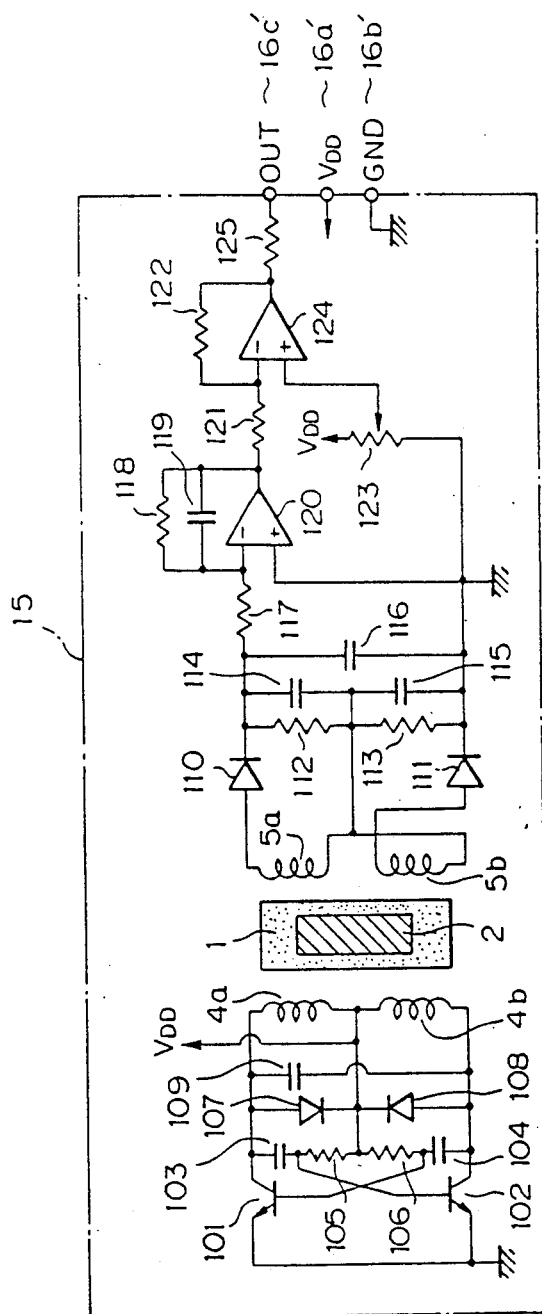

FIG. 6 is a longitudinal sectional view of an acceleration sensor according to a fourth embodiment of the present invention. FIG. 7 is a lateral sectional view along the line A—A of FIG. 6. Reference numeral 1 is a magnetic fluid and 2 a right cylindrical permanent magnet which stably floats in the magnetic fluid 1. Reference numeral 3 is a cylindrical plastic coil bobbin around which are wound primary coils 4a and 4b and secondary coils 5a and 5b. Reference numeral 6 is a plastic holder placed concentrically around the permanent magnet 2 with a slight clearance therebetween and fixed to the center of the coil bobbin 3. Reference numeral 7 is a plastic front plate fixed by melt-fusion with the projection portion 3a of the coil bobbin 3. Reference numeral 9 is an O-ring for sealing. Reference numeral 10 is a plastic end plate fixed to the coil bobbin 3 like the front plate 7. Reference numeral 11 is an O-ring. The rest of the space in the cylindrical space surrounded by the coil bobbin 3, the front plate 7 and the end plate 10 is filled with the magnetic fluid 1. The sides of the front plate 7 and end plate 10 contacting the magnetic fluid have formed thereon taper surfaces 7a and 10a. Reference numeral 8 is a plastic plug inserted in the front plate 7. Reference numeral 12 is a magnetic offset adjustment screw and 13 a nut, which is screwed into the end plate 10. Reference numeral 14 is an iron shield case which covers the entire assembly. The distance between the surface 7a and the shield case 14 is made the same as the distance between the surface 10a and the shield case 14. Reference numeral 15 is a drive circuit of the primary coils 4a and 4b and a detection circuit for the outputs from the secondary coils 5a and 5b. Reference numeral 16 is a connector. There are three terminals 16a, 16b, and 16c (not shown), which serve as a + power source terminal, a ground terminal, and a sensor output terminal. Reference numeral 17 is a plastic cover which supports the connector 16 and is affixed to the shield case 14. The circuit portion 15 is shown in FIG. 16. In FIG. 16, the circuit portion 15 has terminals 16a', 16b', and 16c' which are respectively connected to the terminals 16a, 16b, and 16c. The emitters of the transistors 101 and 102 are grounded and the base of the transistor 101 is connected through a capacitor 104 to the collector of a transistor 102. The base of the transistor 102 is connected through a capacitor 103 to the collector of the transistor 101. The base of the transistor 101 and the base of the transistor 102 are connected through resistors 105 and 106 in series. The connection point of the resistors 105 and 106 is connected to + power source $V_{DD}$. The primary coils 4a and 4b constitute a single coil wound in the same direction with an intermediate point connected to $V_{DD}$. The other end of the primary coil 4a is connected to the collector of the transistor 101 and the other end of the primary coil 4b is connected to the collector of the transistor 102. The collectors of the transistors 101 and 102 are connected through a capacitor 109. Reference numerals 107 and 108 are flyback absorption diodes connected in parallel with the coils 4a and 4b. The above circuit construction forms a multivibrator. The secondary coils 5a and 5b are wound divisionally around the coil bobbin 3. The coils 5a and 5b are respectively wound continuously, but have different winding directions from each other. One end of the secondary coil 5a is connected through a diode 110 to a resistor 112, capacitor 114, capacitor 116, and resistor 117, while one end of the coil 5b is connected through a diode 111 to a resistor 113, capacitor 115, and the other end of the capacitor 116. The other ends of the resistors 112 and 113 and the capacitors 114 and 115 are all connected to the other end of the coil 5a and the other end of the coil 5b. The cathode of the diode 110 is connected through a resistor 117 to the negative input terminal of an operational amplifier 120, a resistor 118, and a capacitor 119. The other ends of the resistor 118 and capacitor 119 are connected to the output terminal of the operational amplifier 120. The cathode of the diode 111 is grounded along with the positive input terminal of the operational amplifier 120. The output terminal of the operational amplifier 120 is connected through a resistor 121 to the negative input terminal of an operational amplifier 124 and a resistor 122 and the other end of the resistor 122 is connected to the output terminal of the operational amplifier 124. The positive input terminal of the operational amplifier 124 is connected to the variable terminal of a variable resistor 123 and the two ends of the variable resistor 123 are connected to the + power source $V_{DD}$ and the ground, respectively. The output terminal of the operational amplifier 124 is connected through a resistor 125 to an output terminal 16c' through which the output is taken out to the outside.

The important point in the present invention lies in the control of the centralized characteristics of the permanent magnet. That is, the position of the permanent magnet 2 when no acceleration G is applied is predetermined as the central position. Further, the linear characteristics of the return force with respect to the displacement of the magnet offer a more useful application. In the present invention, various methods are shown, and first the action in the embodiment of FIG. 1 is discussed. In the embodiment of FIG. 1, the shape of the internal receptacle of the nonmagnetic case 19 is uniformly cylindrical. A cylindrical holder 6 is provided concentrically with the case 19. A permanent magnet 2 is disposed in the inside cylindrical space 6a of the holder 6. The inside cylindrical space 6a of the holder 6 and the cylindrical space 6b defined by the case 19 and the holder 6 are communicated at the two end portions. The inside diameter of the inside cylindrical space (i.e., the internal receptacle) 6a of the holder 6 is smaller than the maximum outside diameter of the magnetic fluid attracted to the permanent magnet 2 in the natural state, and the length of the inside cylindrical space 6a of the holder 6 is less than the maximum length of the magnetic fluid attracted to the permanent magnet 2 in the natural state. Here, "magnetic fluid attracted to the permanent magnet 2 in the natural state" means the "magnetic fluid which can be attracted around the magnet 2 when the magnet 2 is placed in a container filled with the magnetic fluid and then lifted up at an ordinary temperature and pressure". Now, in FIG. 1, when the acceleration G is applied as the arrow shown in the figure, the magnet 2 moves relatively in the direction opposite to the arrow and stops at the equilibrium point of the magnetic return force and the inertia force. When the acceleration G is not applied, the permanent magnet 2 is positioned at the center and the distances from the permanent magnet 2 to the Hall elements 41a and 41b are the same. Further, the Hall elements 41a and 41b output positive voltages with respect to the S and N poles, respectively. Therefore, the differential output is zero. When the acceleration G is applied and the permanent magnet 2 moves, a differential output is caused between the Hall elements 41a and 41b. This differential output is amplified by the operational amplifier 320 and then output. When the acceleration G disappears, the permanent magnet 2 returns to its original neutral position and the differential output again becomes zero. The amount of the magnetic fluid sealed inside may not be too great or too small. If too great, this would cause a zone of insensitivity where the magnet moves irregardless of the acceleration or would cause an unnecessary portion which is not used at all. If too small, there would produce an air layer between the case and the magnet which would cause erroneous operation or friction would be caused between the magnet and the case and hysteresis phenomenon would be caused. The suitable amount of the magnetic fluid is the total amount of magnetic fluid attracted to the permanent magnet 2 in the natural state. The state of attraction of the magnetic fluid to the magnet in the natural state is shown schematically in FIG. 19. The maximum amount of magnetic fluid attracted to the magnet in the natural state is determined by the balance of the magnetic attraction to the permanent magnet, the surface tension of the magnetic fluid, and gravity. As a result, in FIG. 19, at the portion around the magnet 2 with the greater the amount of magnetic fluid attracted, the stronger the magnetic viscoelasticity spring force. Therefore, the inside diameter of the inside cylindrical space 6a of the holder 6 is made smaller than the maximum outside diameter of the magnetic fluid attracted to the permanent magnet 2 in the natural state, whereby the sensitivity of the permanent magnet movement with respect to the acceleration other than in the axial direction of the permanent magnet is reduced. Also, the length of the inside cylindrical space 6a of the holder 6 is made smaller than the maximum length of the magnetic fluid attracted to the permanent magnet 2 in the natural state, whereby it is possible to raise the sensitivity of the permanent magnet movement with respect to the acceleration in the axial direction of the permanent magnet. Further, the bypass passage of the magnetic fluid prevents changes in the pressure during displacement of the magnet. If there were no bypass passage, the sensor would be affected by pressure changes arising along with temperature changes etc. and it would no longer be possible to unilaterally determine the amount of movement of the permanent magnet with respect to the acceleration.

In the embodiment of FIG. 1, the amount of the displacement of the permanent magnet 2 is detected by Hall elements, but as shown in FIG. 6 it is also possible to use differential transformer. In FIG. 6, when the acceleration G is not applied, the voltage signals generated at the secondary coils 5a and 5b, which are induced by the AC signals applied to the primary coils 4a and 4b, are the same since the permanent magnet and the magnetic fluid are at the same position relative to the secondary coils 5a and 5b. Therefore, the differential output is zero. When the acceleration G is applied and the permanent magnet 2 moves, a difference occurs between the outputs of the secondary coils 5a and 5b and is amplified by the operational amplifiers 120 and 124 and then output. When the acceleration G disappears, the permanent magnet 2 returns to its original neutral position and the differential output again becomes zero.

Figure 13:
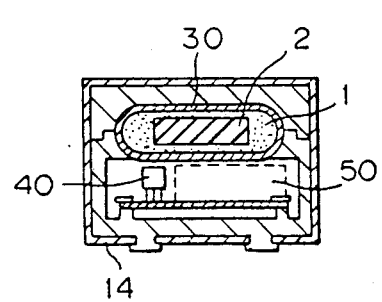
FIG. 13 is a view showing a construction in which a magnetic resistance element as the permanent magnet-position detection means is used.
Figure 15:
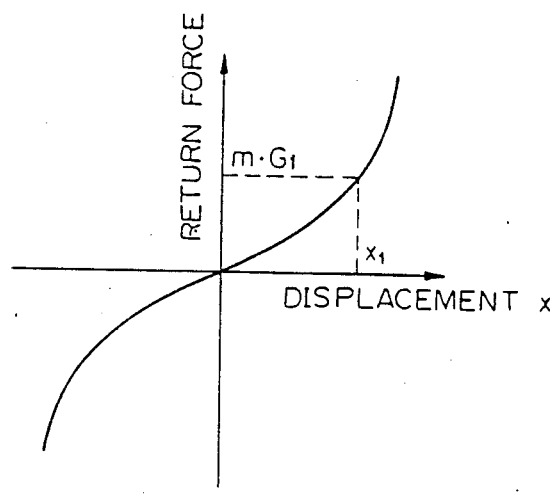
FIG. 15 is a view showing the relationship between the displacement of the permanent magnet placed in the magnetic fluid and the force of the return to the equilibrium position acting on the permanent magnet.
Figure 17:
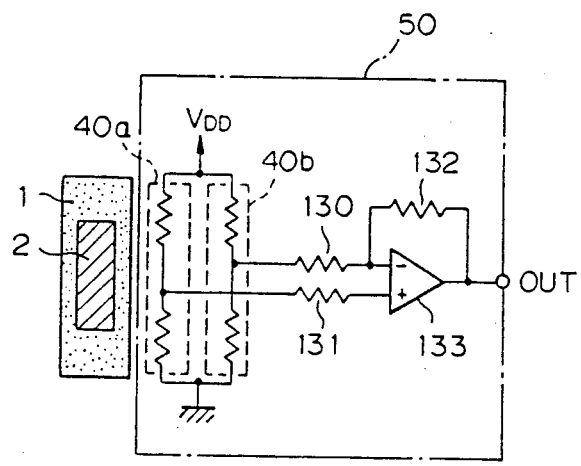
FIG. 16 and FIG. 17 are views showing other specific examples of the processing circuit for processing signals from the permanent magnet-position detection means.

In the embodiment of FIG. 6, around the permanent magnet 2 there is provided a nonmagnetic holder 6, with an internal circumference larger than the diameter of the permanent magnet 2, an outside circumference smaller than the internal circumference of a coil bobbin 3 which also serves as the case of the magnetic fluid, and a length a little shorter than the permanent magnet, in a manner so as to be positioned at the center of the magnetic fluid overall. The state of the magnetic fluxes at this time is shown schematically in FIG. 18(b). Compared to the case of no nonmagnetic holder 6 (FIG. 18(a)), in FIG. 18(b), the magnetic fluxes 200 do not pass through the nonmagnetic holder 6 and thereby the magnetic fluxes are bent and squeezed in and this state is like that when tension is applied to a rubber band. Further, the magnet 2 is made to be slightly longer than the holder 6. In the vicinity of the magnetic poles, i.e., the high density portions of the magnetic fluid tend to be at the sides of the holder 6. Thus, the repulsion force functions with not only the side walls of the case 100, but also the side walls 400 an 401 of the holder 6. Therefore, the return force when the magnet 2 displaces becomes greater. Further, as shown in FIG. 13, it is possible to arrange a magnetic resistance element 40, for example, with respect to a case 30 sealing in the magnetic fluid 1 and the permanent magnet 2 and detecting the leakage magnetic field from the permanent magnet 2. By using a bridge element, the detection circuit 50 is simply constructed with just input resistors 130 and 131, an operational amplifier 133, and a feedback resistor 132 as shown in FIG. 17. The return force characteristic of the permanent magnet emplaced in the sealed magnetic fluid in general is shown in FIG. 15. Note that in FIG. 15, m is the mass of the permanent magnet and $G_1$ is the acceleration (acceleration in the axial direction of the permanent magnet) corresponding to the displacement $X_1$. Therefore, by appropriately selecting the position of the magnetic resistance element, it is possible to characterize the output voltage with respect to the acceleration linear, S-th curved, etc.

Figure 12:
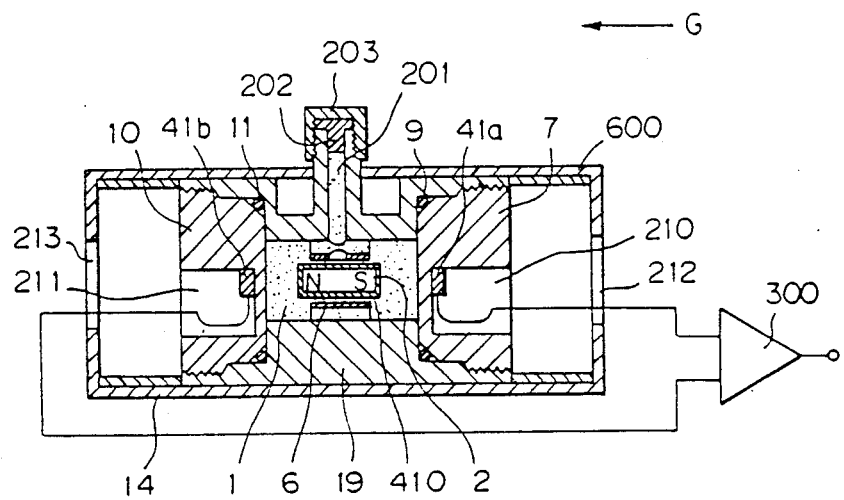
FIG. 12 is a longitudinal sectional view of an acceleration sensor according to a still further embodiment of the present invention.

Further, FIG. 12 is a longitudinal sectional view of an acceleration sensor according to a still further embodiment of the present invention. The main structural portion 600 of the acceleration sensor is the same as that of the fourth embodiment (however, the permanent magnet 2 has a cover 410 such as shown in the first embodiment). As the position detection means, for example, the same type of Hall elements as in the first embodiment are utilized.

In the case of such a construction, if the air or gas is mixed in addition to the magnetic fluid in the holder case 19, the sensor would be affected by temperature changes. The magnetic fluid injection port 201 in FIG. 12 is protruded outward to solve such problem. That is, the gas in the case 19 is drawn out in advance by a vacuum device, not shown, then the magnetic fluid is sealed in. This enables sealing in of just the magnetic fluid. Note that reference numeral 202 is a rubber seal and 203 is an aluminum cap which is screwed onto the holder case 19.

Further, the taper portion 7a provided at the front plate 7 in FIG. 6 is for releasing gas when sealing in the magnetic fluid. That is, after the coils 4a, 4b and 5a, 5b are wound on the coil bobbin 3, the end plate 10 and the holder 6 are assembled, then the magnet 2 is inserted and the magnetic fluid 1 is filled. After that, the case is closed by the front plate 7, but the plug 8 is left open. So, the excess of the magnetic fluid flows out from the opening along with the mixed gas. Then, the plug 8 is closed. This enables a suitable amount of magnetic fluid to be sealed in and the gas like as the air to be released. Further, it is preferable that the end faces of the magnetic fluid opposing the end faces of the magnet (magnetic pole faces), corresponding to the taper portion 7a of the front plate 7 and the taper portion 10a of the end plate 10, are the same in shape. Further, the distance from the end faces (7a and 10a) to the shield case 14 should be equal to prevent shifting of the neutral position of the magnet 2 from the center and to prevent the position-return force characteristic of the magnet 2 from becoming nonlinear. A screw 12 is made of iron and constitutes a magnetic offset adjustment means enabling adjustment of the above two distances by simple method. Further, the base fluid of the magnetic fluid includes water, paraffin, or other synthetic oils including stably dispersed magnetite (FeO, $Fe_2O_3$) or manganese zinc ferrite, and moreover the base fluid includes a metal such as mercury so long as it is a fluid including stably dispersed magnetic particles such as cobalt etc., of course.

Further, as in FIG. 22, the permanent magnet 2 may be provided with an aluminum or other nonmagnetic (for example, epoxy resins) cover 410. When a strong magnet such as a rare earth magnet is used so as to increase the return force, the magnetic field near the magnet will be strong, so the magnetic particles dispersed in the magnetic fluid will tend to coagulate against the repulsion force of the surface active agent in dependence on the function of the time t. Therefore, by covering the permanent magnet 2 with a nonmagnetic cover 410, it is possible to obtain simultaneously both the large magnetic field required for the return force and the maximum magnetic field acting on the magnetic fluid below a predetermined value.

Figure 8:
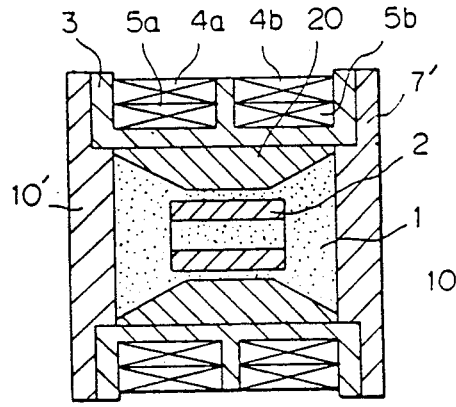
FIG. 8, FIG. 9, FIG. 10, and FIG. 11 are views showing various modifications of the case portions in which the permanent magnet and magnetic fluid are sealed.
Figure 9:
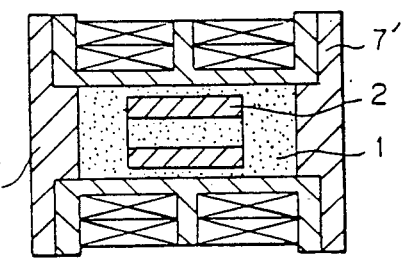

FIG. 8 and FIG. 9 show other embodiments including the means for controlling the characteristic of the return force acting on the permanent magnet 2 with respect to the displacement from the center portion in the magnetic fluid in the present invention. In FIG. 8, a nonmagnetic member 20 is used to reduce the cross-sectional area of the magnetic fluid sealing portion corresponding to the magnet sideface portion. The cross-sectional shape of the magnet fluid sealing portion is tapered so that the further from the magnetic poles, the larger the cross-sectional area of the magnetic fluid. In FIG. 9, the magnetic fluid sealing portion is shaped as a simple cylinder. In these examples, the feature is that the amount of the magnetic fluid sealed in is the maximum amount attracted to the permanent magnet 2 in the natural state. This, as mentioned earlier, is based on the idea that the best amount of the magnetic fluid is the total amount of the magnetic fluid attracted to the permanent magnet 2 in the natural state. FIG. 21 shows a further development of the idea shown in FIG. 9. That is, in the embodiment of FIG. 9, the stronger magnetic return force characteristic is offered with a combination of the best amount of the magnetic fluid and a simple cylinder case slightly larger than the outside diameter of the permanent magnet. According to the embodiment of FIG. 9, while the effect is enlarged, the displacement of the permanent magnet with respect to the acceleration is conversely small and it is required to raise the detection sensitivity. This is due to the fact that the portions 1a and 1b near the magnet poles of the magnetic fluid shown in FIG. 19 are compressed along with the displacement of the magnet and a repulsion force is generated. And, in the construction of FIG. 9, there was nowhere for the pressure, accompanying the movement of the increased apparent specific gravity portions (1a and 1b) of the magnetic fluid, to escape. Thus a pressure spring is created between the plate 7' or 10' and magnet 2, which strongly suppresses the displacement of the magnet 2. Therefore, as shown in FIG. 21, the inside of a case 30 is formed with a center portion 30c, having the same length as the magnet assembly of the magnet 2 and magnetic pole pieces 151a and 151b with a reduced diameter, and expanded diameter portions 30a and 30b, exceeding the portion of the length of the magnet assembly in the axial direction. That is, specifically, the length of the internal receptacle of the case 30 in the axial direction is made smaller than the maximum length of the magnetic fluid attracted to the permanent magnet in the natural state, the inside diameter of the reduced diameter portion is made roughly equal to the minimum outside diameter of the magnetic fluid attracted to the permanent magnet in the natural state, and the inside diameter of the expanded diameter portions is made at least larger than the maximum outside diameter of the magnetic fluid attracted to the permanent magnet in the natural state. By this, relief portions for the pressure of the magnetic fluid arising along with the deformation of the increased apparent specific gravity portion, forming a curved surface, are provided at the portions 30a and 30b and sufficient return force and sufficient amount of displacement of the permanent magnet are obtained. The magnetic pole pieces 151a and 151b shown in FIG. 21 act to increase the inertia when the magnet 2 is made of a low specific gravity material such as ferrite. Further, in the case of a rare earth magnet, the amount of the magnet is reduced and costs lowered.

Figure 10:
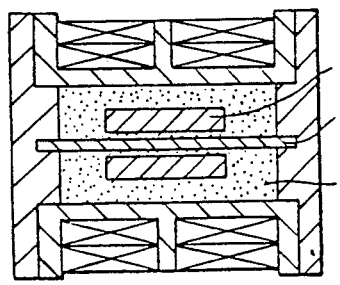
Figure 11:
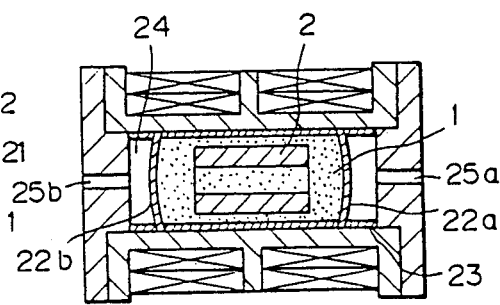

The embodiment of FIG. 10 compulsorily prohibits the displacement of the magnet 2 toward other directions than the axial direction. A support rod 21 fixed to the case is passed through the inside of the cylindrical magnet 2 which is movable on the axis of this rod 21. Further, the embodiment of FIG. 11 features the two stages of acceleration-output characteristics. That is, a large gain upon small acceleration and a small gain upon large acceleration. The magnetic fluid 1 is sealed by elastic membranes 22a and 22b made of rubber or the like and the outside is filled with air or other gases or other low specific gravity substances. Reference numerals 25a and 25b are escape holes for when air is used as the low specific gravity substance. In the present embodiment, for a small acceleration, a magnet 2 with a specific gravity of, for example, 8.3 displaces in a magnetic fluid 1 of a specific gravity of, for example, 1.3 and the displacement is detected. For a large acceleration, the magnet 2 and the magnetic fluid 1 displace by overcoming the elastic membrane 22a or 22b, and the displacement is detected. In this way, a wide range acceleration sensor which measures from extremely small to large accelerations is offered.

The embodiment of FIG. 13, as mentioned before, uses a magnetic resistance element 40 as the displacement detection means of the magnet. A magnetic resistance element is an element whose resistance changes along with a magnetic field. And the element enables analog magnetic detection by using the fact that the resistance change under a saturated magnetic field is based on the direction of the magnetic field. In FIG. 13, the magnetic fluid 1 and the magnet 2 are sealed in a nonmagnetic case 30 made of glass or plastic and a magnetic resistance element 40 is provided at the outer portion of the case 30 near the end portion of the permanent magnet 2. This magnetic resistance element 40 may be a single element which comprises the detection circuit or may, as shown in FIG. 17, be comprised of the bridge construction 40a and 40b. Further, for example, as shown in FIG. 20, a pair of magnetic resistance elements 40a and 40b may be placed at point symmetrical positions with the point of symmetry at the center of the magnet 2 and thus cancel the effects arising due to the slant of the permanent magnet.

The present invention offers an acceleration sensor with simple structure and high sensitivity utilizing the inertia force, which the permanent magnet placed in the magnetic fluid receives upon acceleration, and the magnetic return force toward the central stable position.

We claim:

1. An acceleration sensor comprising:
   a magnetic fluid,
   a permanent magnet emplaced movably in said magnetic fluid,
   a stable position where the permanent magnet is in a stable state, said stable position being located at a center position in said magnetic fluid, said permanent magnet being displaceable by an inertia force in an acceleration state,
   a nonmagnetic casing in which said magnetic fluid and said permanent magnet are sealed and from which air is substantially excluded,
   a magnetic-electric detection means for detecting a position of said permanent magnet where said inertia force exerted on said permanent magnet is balanced with a restoration force at said center position, said magneto-electric detection means generating a position detection signal concerning said position of said permanent magnet,
   a processing circuit for processing said position detection signal,
   wherein the acceleration sensor is magnetically shielded by a case made of a ferromagnetic material which prevents influence from external magnetic fields, and
   including a magnetic offset adjustment means made of a ferromagnetic material and movable in an axial direction of the permanent magnet for enabling adjustment of the stable position of the permanent magnet at a zero acceleration state.

2. An acceleration sensor according to claim 1, wherein the permanent magnet is covered by a nonmagnetic cover.

3. An acceleration sensor according to claim 1, wherein said magneto-electric detection means includes a magnetic field detecting element which is one of a magnetic resistance element and a Hall element.

4. An acceleration sensor according to claim 3, including a second magnetic field detection element, wherein both magnetic field detection elements face the magnetic poles of the permanent magnet to provide one of a bridge construction and a differential output between said detection elements.

5. An acceleration sensor according to claim 1, wherein the distance in the axial direction of the permanent magnet from one of the inside faces of the ferromagnetic case to one of the magnetic pole faces of the permanent magnet facing the inside face is equal to the distance from the other of the inside faces of the ferromagnetic case to the other of the magnetic pole faces of the permanent magnet facing the inside face.

6. An acceleration sensor according to claim 1, wherein the acceleration sensor is made by first placing the inside of the case in a almost vacuum state, then sealing in the magnetic fluid.

7. An acceleration sensor comprising:
a magnetic fluid,
a permanent magnet emplaced movably in said magnetic fluid,
a stable position where the permanent magnet is in a stable state, said stable position being located at a center position in said magnetic fluid, said permanent magnet being displaceable by an inertia force in an acceleration state,
a nonmagnetic casing in which said magnetic fluid and said permanent magnet are sealed and from which air is substantially excluded,
a magnetic-electric detection means for detecting a position of said permanent magnet where said inertia force exerted on said permanent magnet is balanced with a restoration force at said center position, said magneto-electric detection means generating a position detection signal concerning said position of said permanent magnet,
a processing circuit for processing said position detection signal, and
at least one pair of elastic membranes with the magnetic fluid and the permanent magnet being sealed in between said elastic membranes.

8. An acceleration sensor comprising:
a non-magnetic casing;
a magnetic fluid in said non-magnetic casing;
a permanent magnet arranged movably in said magnetic fluid movable in a predetermined direction by an inertia force during acceleration;
a limitation member formed at a predetermined distance from the surface of said permanent magnet in a direction perpendicular to said predetermined direction of movement, said predetermined distance being selected to be less than a thickness of said magnetic fluid attached to said permanent magnet under a condition caused by surface tension of the magnetic fluid at standard temperature and pressure to limit the motion of said permanent magnet in said perpendicular direction;
a bypass passage different from a passage between said limitation member and said permanent magnet for communicating portions of the magnetic fluid on both sides of said permanent magnet in said predetermined direction to release the magnetic fluid portion from the side where said magnetic fluid portion is pressurized by said permanent magnet to the other side of said permanent magnet;
a detection means for detecting the position of said permanent magnet; and
a calculation means for calculating the acceleration based on a position signal from said detection means.

9. An acceleration sensor according to claim 8, wherein an internal receptacle of said case is shaped so that a length in an axial direction of the permanent magnet is less than a maximum length of the magnetic fluid attracted to the permanent magnet in said condition and an inside diameter of the portion facing the axial direction length of the permanent magnet is roughly equal to a minimum outside diameter of the magnetic fluid attracted to the permanent magnet in said condition and the inside diameter of the two ends exceeding the portion of length equal to the axial direction length of the permanent magnet is at least larger than a maximum outside diameter of the magnetic fluid attracted to the permanent magnet in said condition.

10. An acceleration sensor according to claim 8, wherein said bypass passage penetrates said non-magnetic casing.

11. An acceleration sensor according to claim 8, wherein said bypass passage comprises a passageway formed internally through said permanent magnet.

12. An acceleration sensor according to claim 11, wherein said permanent magnet is cylindrical in shape.

13. An acceleration sensor according to claim 8, wherein said bypass passage comprises a space formed between said limitation member and said non-magnetic casing.

14. An acceleration sensor according to claim 8, wherein the permanent magnet is covered by a nonmagnetic cover.

15. An acceleration sensor according to claim 8, wherein the detection means of the permanent magnet includes a magnetic field detecting element which is one of a magnetic resistance element and a Hall element.

16. An acceleration sensor according to claim 15, including a second magnetic field detection element, wherein both magnetic field detection elements face the magnetic poles of the permanent magnet to provide one of a bridge construction and a differential output between said detection elements.

17. An acceleration sensor according to claim 8, wherein the acceleration sensor is magnetically shielded by a case made of a ferromagnetic material.

18. An acceleration sensor according to claim 17, wherein a distance in an axial direction of the permanent magnet from one of the inside faces of the ferromagnetic case to one of the magnetic pole faces of the permanent magnet facing the inside face is made equal to the distance from the other of the inside faces of the ferromagnetic case to the other of the magnetic pole faces of the permanent magnet facing the inside face.

19. An acceleration sensor according to claim 17, including a magnetic offset adjustment means made of a ferromagnetic material and movable in the axial direction of the permanent magnet for enabling adjustment of a stable position of the permanent magnet at the zero acceleration state, said stable position being located at a center position in said magnetic fluid.

20. An acceleration sensor according to claim 8, having at least one pair of elastic membranes, the magnetic fluid and the permanent magnet being sealed in between said elastic membranes.

21. An acceleration sensor according to claim 8, wherein the acceleration sensor is made by first placing the inside of the case in an almost vacuum state, then sealing in the magnetic fluid.

22. An acceleration sensor according to claim 8, including a magnetic offset adjustment means made of a ferromagnetic material movable in the axial direction of the permanent magnet used for enabling adjustment of a stable position of the permanent magent at a zero accelaration state, said stable position being located at a given position in said magnetic fluid.

23. An acceleration sensor comprising:
a magnetic fluid,
a permanent magnet emplaced movably in said magnetic fluid,
a stable position where the permanent magnet is in a stable state, said stable position being located at a center position in said magnetic fluid, said permanent magnet being displaceable by an inertia force in an acceleration state, a nonmagnetic casing in which said magnetic fluid and said permanent magnet are sealed and from which air is substantially excluded, a magnetic-electric detection means for detecting a position of said permanent magnet where said inertia force exerted on said permanent magnet is balanced with a restoration force at said center position, said magneto-electric detection means generating a position detection signal concerning said position of said permanent magnet, a processing circuit for processing said position detection signal, and including a magnetic offset adjustment means made of a ferromagnetic material and movable in an axial direction of the permanent magnet for enabling adjustment of the stable position of the permanent magnet at a zero acceleration state.

* * * * *